United States Patent
Zheng et al.

(10) Patent No.: US 10,587,128 B2
(45) Date of Patent: Mar. 10, 2020

(54) CHARGING CONTROL CIRCUIT, CHARGING DEVICE, CHARGING SYSTEM AND CHARGING CONTROL METHOD

(71) Applicant: SZ DJI TECHNOLOGY CO., LTD., Shenzhen (CN)

(72) Inventors: Dayang Zheng, Shenzhen (CN); Yuancai Liu, Shenzhen (CN); Lei Wang, Shenzhen (CN); Wentao Wang, Shenzhen (CN); Juncheng Zhan, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 137 days.

(21) Appl. No.: 15/858,951

(22) Filed: Dec. 29, 2017

(65) Prior Publication Data
US 2018/0123362 A1 May 3, 2018

Related U.S. Application Data

(63) Continuation of application No. PCT/CN2015/082827, filed on Jun. 30, 2015.

(51) Int. Cl.
*H02J 7/00* (2006.01)

(52) U.S. Cl.
CPC .......... *H02J 7/0021* (2013.01); *H02J 7/0013* (2013.01)

(58) Field of Classification Search
CPC ...... H02J 7/0014; H02J 7/0016; H02J 7/0018; H02J 7/0019; B60L 11/1866; B60L 58/22
See application file for complete search history.

(56) References Cited

U.S. PATENT DOCUMENTS

| | | | | |
|---|---|---|---|---|
| 4,849,682 A | * | 7/1989 | Bauer | H02J 7/0004 320/106 |
| 5,057,762 A | * | 10/1991 | Goedken | H02J 7/0008 320/116 |

(Continued)

FOREIGN PATENT DOCUMENTS

| | | |
|---|---|---|
| CN | 1437295 A | 8/2003 |
| CN | 1574447 A | 2/2005 |

(Continued)

OTHER PUBLICATIONS

"Electromagnetic Relays Advantages Disadvantages Applications," Dharma Teja, Electrical Questions Guide, Published Online Nov. 2, 2012, Accessed Online Jul. 4, 2019, http://electricalquestionsguide.blogspot.com/2012/11/electromagnetic-relays-advantages.html.*

(Continued)

*Primary Examiner* — Robert Grant
*Assistant Examiner* — John T Trischler
(74) *Attorney, Agent, or Firm* — Anova Law Group, PLLC

(57) ABSTRACT

A charging control circuit includes a charging unit, a plurality of power output terminals configured to connect with a plurality of rechargeable batteries, respectively, a plurality of switch units each connected between the charging unit and one of the plurality of power output terminals, and a control unit electrically connected with the switch units. The control unit is configured to switch to a first charging mode or a second charging mode, and output, to the switch units, a switch signal corresponding to the first charging mode or the second charging mode. The switch signal causes the switch units to switch on or off electrical connections between the charging unit and the plurality of power output terminals.

18 Claims, 7 Drawing Sheets

(56) References Cited

U.S. PATENT DOCUMENTS

| | | | | |
|---|---|---|---|---|
| 5,218,286 A * | 6/1993 | VanDunk | H02J 7/0003 | 320/125 |
| 5,780,991 A * | 7/1998 | Brake | H01M 10/441 | 320/106 |
| 5,808,442 A * | 9/1998 | Kaite | H01M 10/441 | 320/125 |
| 5,914,606 A * | 6/1999 | Becker-Irvin | G01R 15/04 | 324/434 |
| 6,137,261 A * | 10/2000 | Kurle | G01R 31/36 | 320/132 |
| 6,777,913 B2 * | 8/2004 | You | H02J 7/0013 | 320/125 |
| 6,781,348 B2 * | 8/2004 | Yokohama | H02J 7/0073 | 320/125 |
| 6,803,745 B2 * | 10/2004 | Nishida | H02J 7/0077 | 320/107 |
| 7,456,611 B2 * | 11/2008 | Mullett | H02J 7/0073 | 320/130 |
| 7,612,997 B1 * | 11/2009 | Diebel | G06F 1/1632 | 361/679.41 |
| 7,679,335 B1 * | 3/2010 | Collins | H02J 7/0013 | 320/125 |
| 7,782,011 B2 * | 8/2010 | Nishida | H02J 7/0077 | 320/112 |
| 7,782,607 B2 * | 8/2010 | Harbin | G06F 1/16 | 345/103 |
| 7,800,255 B2 * | 9/2010 | Coonan | G06F 1/16 | 307/149 |
| 7,839,121 B2 * | 11/2010 | Kim | H02J 7/0024 | 320/124 |
| 7,855,530 B2 * | 12/2010 | Coonan | H02J 7/0027 | 320/106 |
| 7,859,224 B2 * | 12/2010 | Baer | H02J 7/0054 | 320/128 |
| 8,004,246 B2 * | 8/2011 | Liu | H01M 10/441 | 320/136 |
| 8,062,782 B2 * | 11/2011 | Wang | H01M 2/1066 | 361/747 |
| 8,089,249 B2 * | 1/2012 | Zhang | H02J 7/0016 | 320/119 |
| 8,160,727 B2 * | 4/2012 | Coonan | G06F 1/1632 | 320/113 |
| 8,169,191 B2 * | 5/2012 | Werthman | A61B 5/0002 | 320/107 |
| 8,227,943 B2 * | 7/2012 | Harbin | H02J 7/0045 | 307/149 |
| 8,237,411 B2 * | 8/2012 | Liu | H01M 10/441 | 320/136 |
| 8,415,923 B2 * | 4/2013 | Forsythe | H02J 7/0008 | 320/110 |
| 8,497,662 B2 * | 7/2013 | Aradachi | H01M 10/4221 | 320/106 |
| 8,519,671 B2 * | 8/2013 | Bao | H02J 7/0073 | 320/128 |
| 8,573,994 B2 * | 11/2013 | Kiko | B60L 3/0069 | 439/188 |
| 8,659,182 B2 * | 2/2014 | Ichikawa | H01M 10/425 | 307/9.1 |
| 8,769,326 B2 * | 7/2014 | Liu | G06F 1/3203 | 713/323 |
| 8,773,068 B2 * | 7/2014 | Nysen | H01M 10/052 | 320/116 |
| 8,775,828 B2 * | 7/2014 | Coonan | A61B 5/7475 | 713/300 |
| 8,836,290 B2 * | 9/2014 | Liu | H01M 10/441 | 320/136 |
| 8,859,124 B2 * | 10/2014 | Tanno | H01M 10/441 | 320/134 |
| 8,963,496 B2 * | 2/2015 | Yang | H01M 2/1066 | 320/113 |
| 9,035,496 B2 * | 5/2015 | Kang | H02J 1/10 | 307/71 |
| 9,142,999 B2 * | 9/2015 | Von Novak | H02J 7/0004 | |
| 9,184,615 B2 * | 11/2015 | Kim | H02J 7/007 | |
| 9,197,081 B2 * | 11/2015 | Finberg | H02J 7/0016 | |
| 9,213,066 B2 * | 12/2015 | Wade | H02J 7/0018 | |
| 9,242,571 B2 * | 1/2016 | Fukui | H02J 7/0004 | |
| 9,252,463 B2 * | 2/2016 | Yang | H02J 7/007 | |
| 9,337,683 B2 * | 5/2016 | Phillips | H02J 7/0073 | |
| 9,425,641 B2 * | 8/2016 | Kominami | H02J 7/022 | |
| 9,564,763 B2 * | 2/2017 | Finberg | H02J 7/0016 | |
| 9,592,744 B2 * | 3/2017 | Zhao | B60L 11/1822 | |
| 9,601,938 B2 * | 3/2017 | Huang | H02J 7/0055 | |
| 9,634,517 B2 * | 4/2017 | Davis | H02J 7/042 | |
| 9,690,349 B2 * | 6/2017 | Muccini | G06F 1/263 | |
| 9,726,731 B2 * | 8/2017 | Yang | H02J 7/0013 | |
| 9,728,989 B2 * | 8/2017 | Kim | H02J 7/0068 | |
| 9,728,991 B2 * | 8/2017 | Jagenstedt | H02J 7/007 | |
| 9,735,590 B2 * | 8/2017 | Wang | H02J 7/0016 | |
| 9,762,069 B2 * | 9/2017 | Bourilkov | H02J 7/0006 | |
| 9,912,178 B2 * | 3/2018 | Nysen | H01M 10/052 | |
| 9,923,392 B2 * | 3/2018 | Weinstein | H02J 7/0044 | |
| 9,981,568 B2 * | 5/2018 | Minamiura | B60L 3/0046 | |
| 10,074,998 B2 * | 9/2018 | Mo | H02J 7/00 | |
| 10,090,700 B2 * | 10/2018 | Zhang | H02J 7/0027 | |
| 10,122,187 B2 * | 11/2018 | Hwang | H02J 7/0021 | |
| 10,122,201 B2 * | 11/2018 | Zhang | H02J 7/0027 | |
| 10,141,766 B2 * | 11/2018 | Zhang | H02J 7/0027 | |
| 10,181,745 B2 * | 1/2019 | Zhang | H02J 7/0027 | |
| 10,224,737 B2 * | 3/2019 | Zhang | H02J 7/0027 | |
| 10,266,133 B2 * | 4/2019 | Tang | H01R 43/18 | |
| 10,277,053 B2 * | 4/2019 | Zhang | H02J 7/0027 | |
| 10,283,976 B2 * | 5/2019 | Luo | G05B 15/02 | |
| 10,291,043 B2 * | 5/2019 | Zhang | H02M 3/335 | |
| 10,291,060 B2 * | 5/2019 | Tian | H02M 3/335 | |
| 10,312,712 B2 * | 6/2019 | Zhang | H02J 7/0027 | |
| 10,320,217 B2 * | 6/2019 | Zhang | H02J 7/0027 | |
| 10,320,225 B2 * | 6/2019 | Tian | H02M 3/335 | |
| 10,326,294 B2 * | 6/2019 | Wang | H02J 7/0068 | |
| 10,326,297 B2 * | 6/2019 | Zhang | H02J 7/0027 | |
| 2003/0006734 A1 * | 1/2003 | You | H02J 7/0013 | 320/125 |
| 2003/0184261 A1 * | 10/2003 | Yokoyama | H02J 7/0073 | 320/125 |
| 2003/0184263 A1 * | 10/2003 | Nishida | H02J 7/0021 | 320/132 |
| 2004/0113586 A1 | 6/2004 | Chen | | |
| 2005/0001593 A1 * | 1/2005 | Kawasumi | H02J 7/0013 | 320/132 |
| 2005/0046386 A1 * | 3/2005 | Nishida | H02J 7/0021 | 320/116 |
| 2006/0267552 A1 * | 11/2006 | Baer | H02J 7/0054 | 320/128 |
| 2007/0035278 A1 * | 2/2007 | Mullett | H02J 7/0073 | 320/130 |
| 2008/0218124 A1 * | 9/2008 | Yang | H01M 2/1066 | 320/113 |
| 2009/0108804 A1 * | 4/2009 | Aradachi | H01M 10/4221 | 320/106 |
| 2009/0212738 A1 * | 8/2009 | Coonan | H02J 7/0027 | 320/113 |
| 2009/0212744 A1 * | 8/2009 | Werthman | A61B 5/0002 | 320/162 |
| 2009/0212848 A1 * | 8/2009 | Coonan | H02J 7/0027 | 327/517 |
| 2009/0261656 A1 * | 10/2009 | Coonan | G06F 1/16 | 307/80 |
| 2009/0276637 A1 * | 11/2009 | Coonan | A61B 5/7475 | 713/300 |
| 2010/0066311 A1 * | 3/2010 | Bao | H02J 7/0073 | 320/162 |
| 2010/0181829 A1 * | 7/2010 | Ichikawa | H01M 10/425 | 307/9.1 |
| 2010/0295503 A1 * | 11/2010 | Bourilkov | H02J 7/0006 | 320/106 |
| 2011/0109166 A1 * | 5/2011 | Oga | H01M 10/482 | 307/80 |
| 2011/0115298 A1 * | 5/2011 | Oga | H01M 10/482 | 307/77 |

(56) References Cited

U.S. PATENT DOCUMENTS

| | | | |
|---|---|---|---|
| 2011/0121645 A1* | 5/2011 | Zhang | H02J 7/0016 307/9.1 |
| 2011/0193518 A1* | 8/2011 | Wright | H01M 10/44 320/101 |
| 2011/0260685 A1* | 10/2011 | Forsythe | H02J 7/0008 320/110 |
| 2011/0266993 A1* | 11/2011 | Vaish | H01M 10/425 320/101 |
| 2012/0098495 A1* | 4/2012 | Yang | H01M 10/44 320/115 |
| 2012/0126747 A1* | 5/2012 | Kiko | B60L 3/0069 320/109 |
| 2012/0169270 A1* | 7/2012 | Cho | H01M 10/441 320/101 |
| 2012/0261997 A1* | 10/2012 | Kang | H02J 1/10 307/80 |
| 2013/0002203 A1* | 1/2013 | Kuraishi | H02J 7/0018 320/134 |
| 2013/0134933 A1* | 5/2013 | Drew | H02H 5/04 320/109 |
| 2013/0162222 A1* | 6/2013 | Ke | H02J 7/00 320/162 |
| 2013/0241484 A1* | 9/2013 | Kiko | B60L 3/0069 320/109 |
| 2013/0300426 A1* | 11/2013 | Butzmann | H01M 10/4285 324/434 |
| 2014/0009092 A1* | 1/2014 | Ma | B60L 58/15 318/139 |
| 2014/0009120 A1* | 1/2014 | Kim | H02J 7/0068 320/138 |
| 2014/0015478 A1* | 1/2014 | Von Novak | H02J 7/0004 320/108 |
| 2014/0062387 A1* | 3/2014 | Kim | H02J 7/007 320/107 |
| 2014/0132225 A1* | 5/2014 | Jagenstedt | H02J 7/007 320/160 |
| 2014/0132226 A1* | 5/2014 | Sakamoto | B60L 3/0046 320/166 |
| 2014/0253017 A1* | 9/2014 | Kominami | H02J 7/022 320/103 |
| 2014/0265945 A1* | 9/2014 | Deboy | B60L 58/12 318/139 |
| 2014/0266069 A1* | 9/2014 | Deboy | H02J 7/0052 320/149 |
| 2015/0123615 A1* | 5/2015 | Yang | H01M 2/1066 320/112 |
| 2015/0158392 A1* | 6/2015 | Zhao | B60L 11/1822 320/109 |
| 2015/0162781 A1* | 6/2015 | Fratti | H02J 7/0027 320/101 |
| 2015/0185289 A1* | 7/2015 | Yang | H02J 7/0013 324/434 |
| 2015/0207343 A1* | 7/2015 | Zhai | H02M 3/158 320/112 |
| 2015/0236547 A1* | 8/2015 | Davis | H02J 7/042 320/111 |
| 2015/0258910 A1* | 9/2015 | Fukui | H02J 7/0004 701/22 |
| 2015/0288205 A1* | 10/2015 | Weinstein | H02J 7/0044 320/107 |
| 2015/0333553 A1* | 11/2015 | Huang | H02J 7/0055 320/138 |
| 2016/0126761 A1* | 5/2016 | Sanford | A47F 3/005 320/134 |
| 2016/0336781 A1* | 11/2016 | Hwang | H02J 7/0021 |
| 2017/0018941 A1* | 1/2017 | Wang | H02J 7/0068 |
| 2017/0031410 A1* | 2/2017 | Muccini | G06F 1/263 |
| 2017/0063108 A1* | 3/2017 | Wang | H02J 7/0016 |
| 2017/0104353 A1* | 4/2017 | Zhao | H02J 7/0063 |
| 2017/0126031 A1* | 5/2017 | Mo | H02J 7/00 |
| 2017/0136901 A1* | 5/2017 | Zhao | B60L 11/1822 |
| 2017/0155174 A1* | 6/2017 | Wang | H01M 2/1077 |
| 2017/0163060 A1* | 6/2017 | Zheng | H02J 7/0019 |
| 2017/0187082 A1* | 6/2017 | Zhao | B64D 27/24 |
| 2017/0207640 A1* | 7/2017 | Wang | H02J 7/0014 |
| 2017/0229877 A1* | 8/2017 | Zhang | H02J 7/0027 |
| 2017/0264112 A1* | 9/2017 | Tandai | H02J 7/00 |
| 2017/0301966 A1* | 10/2017 | Wang | H01M 10/44 |
| 2017/0305292 A1* | 10/2017 | Minamiura | B60L 3/0046 |
| 2017/0338670 A1* | 11/2017 | Zhang | H02J 7/0027 |
| 2018/0019611 A1* | 1/2018 | Zhang | H02J 7/0027 |
| 2018/0026472 A1* | 1/2018 | Zhang | H02M 3/335 320/145 |
| 2018/0034293 A1* | 2/2018 | Zhang | H02J 7/0027 |
| 2018/0034301 A1* | 2/2018 | Zhang | H02J 7/0027 |
| 2018/0034309 A1* | 2/2018 | Zhang | H02J 7/0027 |
| 2018/0034310 A1* | 2/2018 | Zhang | H02J 7/0027 |
| 2018/0034311 A1* | 2/2018 | Zhang | H02J 7/0027 |
| 2018/0034379 A1* | 2/2018 | Zhang | H02J 7/0027 |
| 2018/0048164 A1* | 2/2018 | Zhang | H02J 7/0027 |
| 2018/0048172 A1* | 2/2018 | Zhang | H02J 7/0027 |
| 2018/0048175 A1* | 2/2018 | Zhang | H02J 7/0027 |
| 2018/0048179 A1* | 2/2018 | Zhang | H02J 7/0027 |
| 2018/0062413 A1* | 3/2018 | Zhang | H02J 7/0027 |
| 2018/0062423 A1* | 3/2018 | Zhang | H02J 7/0027 |
| 2018/0065493 A1* | 3/2018 | Liu | B60L 11/1811 |
| 2018/0069409 A1* | 3/2018 | Tian | H02M 3/335 |
| 2018/0069414 A1* | 3/2018 | Zhang | H02J 7/0027 |
| 2018/0069418 A1* | 3/2018 | Tian | H02M 3/335 |
| 2018/0076636 A1* | 3/2018 | Zhang | H02J 7/0027 |
| 2018/0083477 A1* | 3/2018 | Tian | H02M 3/335 |
| 2018/0090977 A1* | 3/2018 | Zhang | H02M 3/335 |
| 2018/0123183 A1* | 5/2018 | Zheng | H01M 2/02 |
| 2018/0123376 A1* | 5/2018 | Zhang | H02J 7/0027 |
| 2018/0123383 A1* | 5/2018 | Tian | H02M 3/335 |
| 2018/0145377 A1* | 5/2018 | Zheng | H02J 7/34 |
| 2018/0145533 A1* | 5/2018 | Tian | H02M 3/335 |
| 2018/0183260 A1* | 6/2018 | Tian | H02M 3/335 |
| 2018/0183262 A1* | 6/2018 | Tian | H02M 3/335 |
| 2018/0233939 A1* | 8/2018 | Zhang | H02J 7/0027 |
| 2018/0241231 A1* | 8/2018 | Zhang | H02M 3/335 |
| 2018/0254711 A1* | 9/2018 | Zhang | H02J 7/0027 |
| 2018/0262042 A1* | 9/2018 | Tian | H02M 3/335 |
| 2018/0269700 A1* | 9/2018 | Tian | H02M 3/335 |
| 2018/0275202 A1* | 9/2018 | Zhan | H01M 10/42 |
| 2018/0287326 A1* | 10/2018 | Tang | H01R 43/18 |
| 2018/0294666 A1* | 10/2018 | Tian | H02M 3/335 |
| 2018/0331559 A1* | 11/2018 | Tian | H02M 3/335 |
| 2018/0331560 A1* | 11/2018 | Tian | H02M 3/335 |
| 2018/0331561 A1* | 11/2018 | Zhang | H02J 7/0027 |
| 2018/0331562 A1* | 11/2018 | Zhang | H02J 7/0027 |
| 2018/0331563 A1* | 11/2018 | Tian | H02M 3/335 |
| 2018/0331612 A1* | 11/2018 | Zhang | H02J 7/0027 |
| 2018/0342890 A1* | 11/2018 | Tian | H02M 3/335 |
| 2018/0351396 A1* | 12/2018 | Chen | H02M 3/335 |
| 2018/0354633 A1* | 12/2018 | Wang | B64D 27/24 |
| 2018/0358835 A1* | 12/2018 | Tian | H02M 3/335 |
| 2018/0358836 A1* | 12/2018 | Tian | H02M 3/335 |
| 2018/0367047 A1* | 12/2018 | Zhang | H02J 7/0027 |
| 2018/0375352 A1* | 12/2018 | Zheng | H02J 7/0004 |
| 2019/0051950 A1* | 2/2019 | Zheng | H02J 7/0031 |
| 2019/0058333 A1* | 2/2019 | Wang | H05K 5/0217 |
| 2019/0058347 A1* | 2/2019 | Zhang | H02J 7/0027 |
| 2019/0061540 A1* | 2/2019 | Zhao | B60L 11/1822 |
| 2019/0092181 A1* | 3/2019 | Zhao | B60L 11/1822 |
| 2019/0140325 A1* | 5/2019 | Wang | G01R 31/02 |
| 2019/0148951 A1* | 5/2019 | Wang | H02J 7/00 |
| 2019/0157895 A1* | 5/2019 | Zhang | H02J 7/0027 |
| 2019/0185169 A1* | 6/2019 | Xu | B64C 1/06 |

FOREIGN PATENT DOCUMENTS

| | | |
|---|---|---|
| CN | 102480142 A | 5/2012 |
| CN | 102623768 A | 8/2012 |
| CN | 103280854 A | 9/2013 |
| CN | 104247198 A | 12/2014 |
| CN | 104521096 A | 4/2015 |
| CN | 204361767 U | 5/2015 |
| JP | H0287937 A | 3/1990 |
| JP | H06303729 A | 10/1994 |
| JP | H09215217 A | 8/1997 |

(56) References Cited

FOREIGN PATENT DOCUMENTS

JP        10066269 A  *  3/1998
JP       H11191933 A     7/1999
WO    2013073173 A1     5/2013

OTHER PUBLICATIONS

The World Intellectual Property Organization (WIPO) International Search Report for PCT/CN2015/082827 dated Oct. 10, 2015 6 Pages (incuding translation).

* cited by examiner

CHARGING CONTROL CIRCUIT, CHARGING DEVICE, CHARGING SYSTEM AND CHARGING CONTROL METHOD

CROSS-REFERENCE TO RELATED APPLICATION

This is a continuation application of International Application No. PCT/CN2015/082827, filed on Jun. 30, 2015, the entire contents of which are incorporated herein by reference.

TECHNICAL FIELD

The present disclosure generally relates to the field of battery charging technologies, and in particular, to charging control circuits, charging devices, charging systems and charging control methods.

BACKGROUND

At present, portable mobile terminals, cameras, photographic apparatuses and other electronic devices are generally equipped with a plurality of rechargeable batteries. When battery power is used up, the plurality of batteries need to be charged using a charger.

A common charging manner on the market at present is connecting a plurality of rechargeable batteries in parallel, to uniformly charge a rechargeable battery pack in parallel connection. However, the manner has lots of shortcomings. For example, after the rechargeable batteries having different voltage values are connected in parallel, it may result in high voltage batteries discharging to low voltage batteries. Generally the discharge current may be large, and hence is dangerous. In addition, after the plurality of rechargeable batteries are connected in parallel, in the process of charging, it is likely that a charger first charges the low voltage batteries, because the batteries will be fully charged together at the same time. Thus, if a user wants to use a battery fully charged in the process of charging, the user has to wait for a longer time, which is not convenient for use.

SUMMARY

In accordance with the disclosure, there is provided a charging control circuit including a charging unit, a plurality of power output terminals configured to connect with a plurality of rechargeable batteries, respectively, a plurality of switch units each connected between the charging unit and one of the plurality of power output terminals, and a control unit electrically connected with the switch units. The control unit is configured to switch to a first charging mode or a second charging mode, and output, to the switch units, a switch signal corresponding to the first charging mode or the second charging mode. The switch signal causes the switch units to switch on or off electrical connections between the charging unit and the plurality of power output terminals.

Also in accordance with the disclosure, there is provided a charging system including a plurality of rechargeable batteries and a charging control circuit configured to charge the plurality of rechargeable batteries. The charging control circuit includes a charging unit, a plurality of power output terminals configured to connect with a plurality of rechargeable batteries, respectively, a plurality of switch units each connected between the charging unit and one of the plurality of power output terminals, and a control unit electrically connected with the switch units. The control unit is configured to switch to a first charging mode or a second charging mode, and output, to the switch units, a switch signal corresponding to the first charging mode or the second charging mode. The switch signal causes the switch units to switch on or off electrical connections between the charging unit and the plurality of power output terminals.

Also in accordance with the disclosure, there is provided a charging control method including switching to a first charging mode or a second charging mode, outputting a switch signal corresponding to the first charging mode or the second charging mode, and switching on or off electrical connections between a charging unit and a plurality of power output terminals in accordance with the switch signal. The plurality of power output terminals are configured to connect with a plurality of rechargeable batteries, respectively. The charging unit is configured to charge the plurality of rechargeable batteries through the plurality of power output terminals.

DETAILED DESCRIPTION OF THE EMBODIMENTS

The embodiments of the present disclosure will be described below with reference to the accompanying drawings. Apparently, the described embodiments are merely some of the embodiments of the present disclosure rather than all of the embodiments. All other embodiments obtained by a person of ordinary skill in the art based on the embodiments of the present disclosure without creative efforts shall fall within the scope of the present disclosure.

It should be noted that when one element is referred to as "electrically connecting" another element, it may be directly connected to the other assembly or it is also possible that there is an element between them. Further, when one element is considered to "electrically connect" another element, it may be a contact connection, for example, a wire connection, or it may be a non-contact connection, for example, a non-contact coupling.

Unless otherwise defined, all the technical and scientific terms used herein are the same as the meanings generally understood by persons skilled in the technical field of the present disclosure. Herein, the terms used in the specification of the present disclosure are intended to describe specific embodiments, instead of limiting the present disclosure. The term "and/or" used herein includes any combination and all combinations of one or more related items listed.

Some implementation manners of the present disclosure are described below in detail with reference to the accompanying drawings. In the event of no conflict, embodiments described below and features in the embodiments can be combined with each other.

Figure 1:
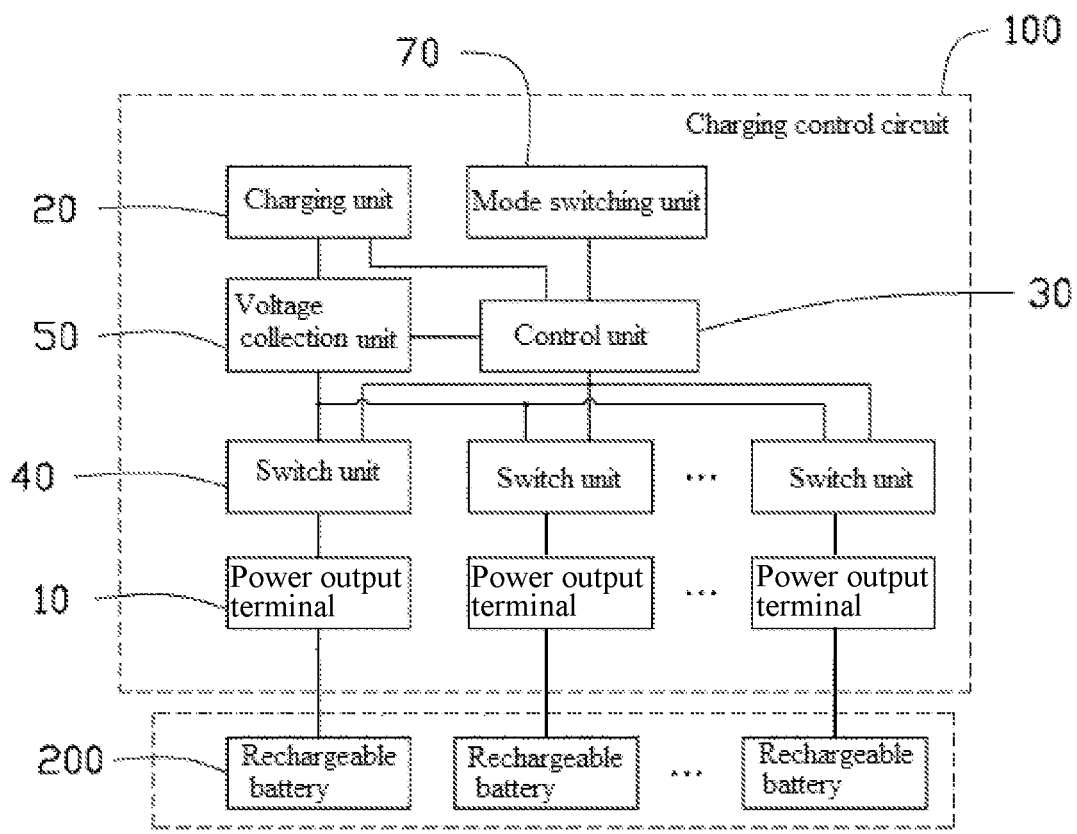
FIG. 1 is block diagram of a charging control circuit according to an embodiment of the present disclosure.

FIG. 1 shows a block diagram of an example charging control circuit 100 consistent with embodiments of the disclosure. The charging control circuit 100 can be used to charge a plurality of rechargeable batteries 200. The charging control circuit 100 includes a plurality of power output terminals 10, a charging unit 20, a control unit 30, a plurality of switch units 40 corresponding to the power output terminals 10 in a one to one manner, and a voltage collection unit 50.

The plurality of power output terminals 10 are connected in parallel with each other and each power output terminal 10 is electrically connected with the charging unit 20 through one of the switch units 40.

The charging unit 20 may include a power input terminal, an AC/DC conversion circuit, and/or a DC conversion circuit, and/or other circuit modules, and is configured to be electrically connected to an external power supply, process the external power supply to generate a corresponding charging voltage, and then output the charging voltage to the power output terminals 10.

The control unit 30 may include a Field-Programmable Gate Array (FPGA), a Micro-Controller Unit (MCU) with a control program embedded therein, a single chip computer, or the like. The control unit 30 may be electrically connected with the plurality of switch units 40 through a control bus, and is configured to output corresponding switch signals to the switch units 40. The switch units 40 receive the switch signals sent by the control unit 30, and switch on or off electrical connections between the charging unit 20 and the corresponding power output terminals 10 in accordance with the switch signals. The charging unit 20 can then charge the rechargeable batteries 200 electrically connected to the power output terminals 10 through the switch units 40 that are switched on and the corresponding power output terminals 10.

The switch units 40 may include Metal Oxide Semiconductor Field Effect Transistors (MOS transistors), relays, or other electronic switches. In this disclosure, embodiments are described with the switch units 40 including MOS transistors as an example. For a switch unit 40, a source of the MOS transistor can be connected with the charging unit 20, a drain of the MOS transistor can be connected with the corresponding power output terminal 10, and a gate of the MOS transistor can be connected with the control unit 30 through the control bus. The control unit 30 can send a corresponding switch signal to the gate of the MOS transistor, for example, a high level signal or a low level signal, so as to control the MOS transistor to switch on or off. When a MOS transistor is switched on, the charging unit 20 may charge a rechargeable battery 200 through the MOS transistor that is switched on and the corresponding power output terminal 10.

In some other embodiments, the switch unit 40 may include an NPN type bipolar junction transistor (BJT) or another electronic switch. For example, when the switch unit 40 includes an NPN type BJT, a base of the NPN type BJT can be connected with the charging unit 30 through the control bus, a collector of the NPN type BJT can be electrically connected with the charging unit 20, and an emitter of the NPN type BJT can be electrically connected with the corresponding power output terminal 10.

The voltage collection unit 50 is electrically connected between the charging unit 20 and the switch units 40 and electrically connected to the control unit 30. The voltage collection unit 50 is configured to collect a voltage of each rechargeable battery 200, and transmit the collected voltage of each rechargeable battery 200 to the control unit 30.

Further, when the plurality of switch units 40 are all switched off to switch off electrical connections between the charging unit 20 and the plurality of power output terminals 10, the voltage collected by the voltage collection unit 50 is an output voltage of the charging unit 20. When one switch unit 40 of the plurality of switch units 40 is switched on, i.e., is in an on state, while the other switch units 40 are all switched off, i.e., are in an off state, the voltage collected by the voltage collection unit 50 is a battery voltage of the rechargeable battery 200 connected to the power output terminal 10 corresponding to the switch unit 40 in the on state. Thus, the control unit 30 can control the switch units 40 to switch on one by one, to control the voltage collection unit 50 to detect battery voltages of the rechargeable batteries 200 connected to the plurality of power output terminals 10 one by one. The control unit 30 can further control the switch units 40 to switch on or off in accordance with the voltages collected by the voltage collection unit 50, so as to switch on or switch off the electrical connections between the charging unit 20 and the corresponding power output terminals 10.

In some embodiments, as shown in FIG. 1, the charging control circuit 100 further includes a mode switching unit 70. The mode switching unit 70 is electrically connected with the control unit 30. The mode switching unit 70 is configured to output a switching signal, for example, a high level signal or a low level signal, to control the charging control circuit 100 to switch between a first charging mode and a second charging mode, e.g., to control the control unit 30 to switch between the first charging mode and the second charging mode. For example, when the control unit 30 receives the high level signal sent by the mode switching unit 70, the control unit 30 can operate in the first charging mode. When the control unit 30 receives the low level signal sent by the mode switching unit 70, the control unit 30 switches to the second charging mode. The switching signal is also referred to as a "mode switching signal."

Output of the switching signal by the mode switching unit 70 may be implemented by means of hardware or software. For example, the mode switching unit 70 includes a button. When the button is pressed down, the mode switching unit 70 outputs a high level signal to the control unit 30, to control the control unit 30 to switch to the first charging mode. When the button is not pressed down, the mode switching unit 70 outputs a low level signal, to control the control unit 30 to switch to the second charging mode. In some other embodiments, the mode switching unit 70 may also include an automatic switching circuit configured to automatically output a corresponding high level signal or a low level signal after detecting a preset trigger condition, to switch an operation mode of the charging control circuit 100.

Relationships between the high and low level signals output by the mode switching unit 70 and the corresponding charging modes may be adjusted in accordance with needs. For example, in some other embodiments, when the mode switching unit 70 outputs a high level signal, the control unit 30 switches to the second charging mode, and when the mode switching unit 70 outputs a low level signal, the control unit 30 switches to the first charging mode. In some other embodiments, when the mode switching unit 70 does not output any switching signal to the control unit 30, the charging control circuit 100 maintains the existing charging mode, for example, the first charging mode or the second charging mode. Once the control unit 30 receives a switching signal output by the mode switching unit 70, switching between charging modes is performed, for example, switching from the first charging mode to the second charging mode or switching from the second charging mode to the first charging mode.

Further, when the charging control circuit 100 operates in the first charging mode, the control unit 30 can control the switch units 40 to switch on one by one, i.e., controls the plurality of power output terminals 10 connect with the charging unit 20 one by one, so that the voltage collection unit 50 can detect battery voltages of the rechargeable batteries 200 connected to the plurality of power output terminals 10 one by one, and hence can detect a rechargeable battery 200 having a highest voltage among the plurality of rechargeable batteries 200. The control unit 30 can then control the switch unit 40 that corresponds to the rechargeable battery 200 with the highest voltage to switch on and control the other switch units 40 to switch off, to control the power output terminal 10 that corresponds to the rechargeable battery 200 with the highest voltage to be connected to the charging unit 20 and the other power output terminals 10 to be disconnected from the charging unit 20, so as to allow the charging unit 20 to first charge the rechargeable battery 200 with the highest battery voltage. When the rechargeable battery 200 with the highest voltage value is charged to a first preset voltage, the voltage collection unit 50 can detect the battery voltages of the remaining rechargeable batteries 200 one by one. The control unit 30 can then control the switch unit 40 that corresponds to the rechargeable battery 200 with the highest voltage value among the remaining rechargeable batteries 200 to switch on and the other switch units 40 to switch off, so as to allow the charging unit 20 to charge the rechargeable battery 200 with the highest voltage value among the remaining rechargeable batteries 200 and charge that rechargeable battery 200 to the first preset voltage. The other rechargeable batteries 200 may be charged one by one in a similar manner. That is, the control unit 30 can control the charging unit 20 to, in accordance with an order of the battery voltages of the rechargeable batteries 200 from high to low, sequentially charge the plurality of rechargeable batteries 200 all to the first preset voltage. Then, the control unit 30 can control all of the plurality of switch units 40 to switch on, to allow the charging unit 20 to charge all of the rechargeable batteries 200 to a second preset voltage.

In the aforementioned first charging mode, the charging control circuit 100 can first charge all of the rechargeable batteries 200 to the first preset voltage one by one in accordance with an order of the battery voltages from high to low, and then charge all the rechargeable batteries 200 simultaneously, i.e., to perform parallel charging. When the plurality of rechargeable batteries 200 start to be charged simultaneously, the battery voltages of the rechargeable batteries 200 are the same, e.g., all equal to the first preset voltage. Therefore, high current discharge from a high voltage battery to a low voltage battery can be avoided. As a result, the rechargeable batteries 200 can be effectively protected, and a charging time of the whole system can be shortened. In some embodiments, in the first charging mode, the charging unit 20 can sequentially charge the plurality of rechargeable batteries 200 to the first preset voltage by means of constant current charging, and then charge the plurality of rechargeable batteries 200 from the first preset voltage to the second preset voltage by means of constant voltage charging.

When the charging control circuit 100 operates in the second charging mode, the control unit 30 can control the switch units 40 to switch on one by one, i.e., controls the plurality of power output terminals 10 connect with the charging unit 20 one by one, so that the voltage collection unit 50 can detect battery voltages of the rechargeable batteries 200 connected to the plurality of power output terminals 10 one by one, and hence can detect a rechargeable battery 200 having a highest voltage among the plurality of rechargeable batteries 200. The control unit 30 can then control the switch unit 40 that corresponds to the rechargeable battery 200 with the highest voltage to switch on and control the other switch units 40 to switch off, to control the power output terminal 10 that corresponds to the rechargeable battery 200 with the highest voltage to be connected to the charging unit 20 and the other power output terminals 10 to be disconnected from the charging unit 20, so as to allow the charging unit 20 to first charge the rechargeable battery 200 with the highest voltage directly to the second preset voltage. After the rechargeable battery 200 with the highest battery voltage is fully charged, the voltage collection unit 50 can detect battery voltages of the remaining rechargeable batteries 200 one by one. The control unit 30 can then control the switch unit 40 that corresponds to the rechargeable battery 200 with the highest voltage among the remaining rechargeable batteries 200 to switch on and the other switch units 40 to switch off, so as to allow the charging unit 20 to charge the rechargeable battery 200 with the highest battery voltage among the remaining rechargeable batteries 200 directly to the second preset voltage. The other rechargeable batteries 200 may be charged one by one in a similar manner. That is, the control unit 30 can detect the battery voltages of the plurality of rechargeable batteries 200 and control the plurality of rechargeable batteries 200 to be charged sequentially in accordance with an order of the battery voltages from high to low.

In the aforementioned second charging mode, the charging control circuit 100 can first charge the rechargeable battery 200 with the highest voltage value, and thus can fully charge one rechargeable battery 200 within a shortest time, which can then be used by a user.

In some embodiments, the first preset voltage is lower than the second preset voltage, and the second preset voltage may be a rated output voltage of the rechargeable battery 200 or a voltage slightly higher than the rated output voltage of the rechargeable battery 200, such as 1.2 times of the rated output voltage of the rechargeable battery 200.

Figure 2:
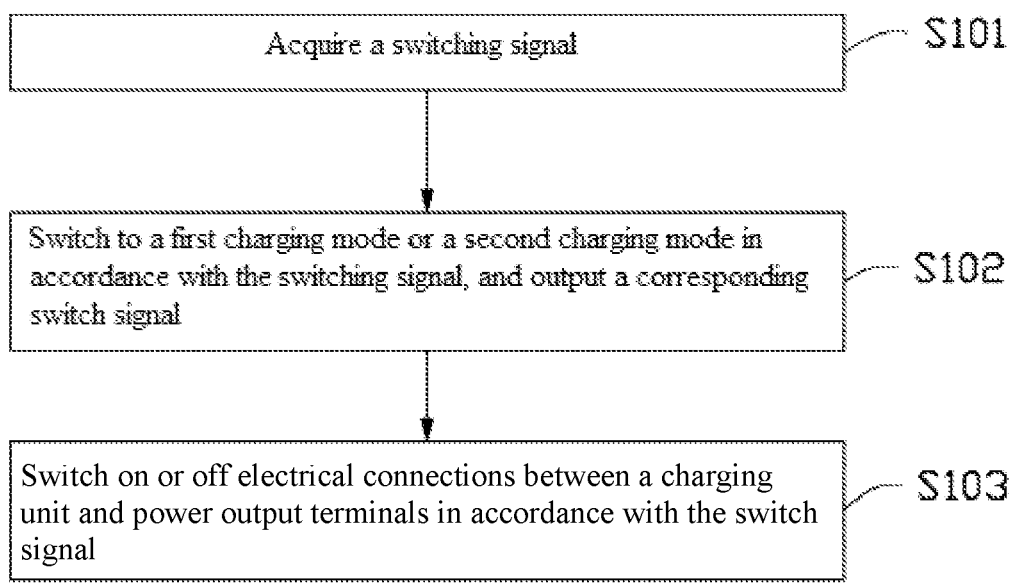
FIG. 2 is a schematic flow chart of a charging control method according to an embodiment of the present disclosure.

FIG. 2 shows a flow chart of a charging control method of the charging control circuit 100 consistent with the present disclosure. As shown in FIG. 2, at S101, a switching signal is acquired. At S102, the charging control circuit is switched to a first charging mode or a second charging mode in accordance with the switching signal, and a corresponding switch signal is output.

For example, in the embodiments described above, the control unit 30 of the charging control circuit 100 is electrically connected to the mode switching unit 70. The mode switching unit 70 is configured to output the switching signal, for example, a high level signal or a low level signal, to control the charging control circuit 100 to switch between the first charging mode and the second charging mode. For example, when the control unit 30 receives the high level signal sent by the mode switching unit 70, the control unit 30 can operate in the first charging mode. When the control unit 30 receives the low level signal sent by the mode switching unit 70, the control unit 30 can switch to the second charging mode.

Output of the switching signal by the mode switching unit 70 may be implemented by means of hardware or software. For example, the mode switching unit 70 includes a button. When the button is pressed down, the control unit 30 may receive a high level signal sent by the mode switching unit 70, and the control unit 30 can switch to the first charging mode. When the button is not pressed down, the control unit 30 may receive a low level signal sent by the mode switching unit 70, and the control unit 30 can switch to the second charging mode. In some other embodiments, the mode switching unit 70 may also include an automatic switching circuit configured to automatically output a corresponding high level signal or a low level signal after detecting a preset trigger condition, to switch an operation mode of the charging control circuit 100.

At S103, electrical connections between the charging unit 20 and the power output terminals 10 are switched on or off in accordance with the switch signal.

For example, in the embodiments described above, the charging control circuit 100 further includes the switch units 40 electrically connected between the charging unit 20 and the corresponding power output terminals 10. By switching on or switching off the switch units 40, the electrical connections between the charging unit 20 and the power output terminals 10 can be switched on or switched off.

In some embodiments, as described above, the charging control circuit 100 further includes a voltage collection unit 50. The control unit 30 can control the switch units 40 to switch on one by one, i.e., control the plurality of power output terminals 10 to connect with the charging unit 20 one by one, to control the voltage collection unit 50 to acquire a battery voltage of each rechargeable battery 200 and control the on or off of the switch units 40 in accordance with the collected voltages.

Figure 3:
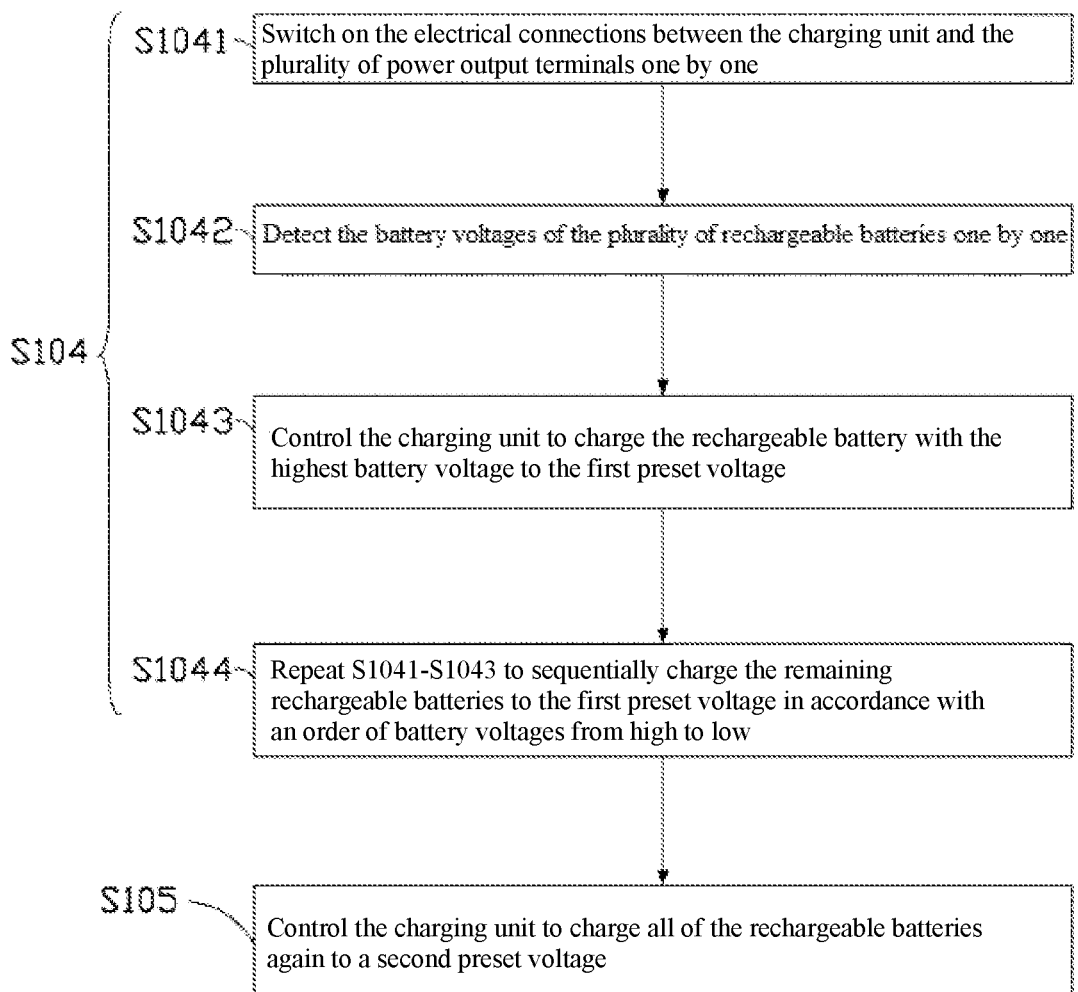
FIG. 3 is a schematic flow chart of a charging process in a first charging mode.

FIG. 3 shows an example charging process in the first charging mode in process S102. As shown in FIG. 3, at S104, the rechargeable batteries 200 are sequentially charged to a first preset voltage in accordance with an order of battery voltages of the rechargeable batteries 200 from high to low.

In some embodiments, as shown in FIG. 3, process S104 include the processes S1041-S1044 described below.

At S1041, the switch units 40 are controlled to switch on one by one, to switch on the electrical connections between the charging unit 20 and the plurality of power output terminals 10 one by one.

At S1042, battery voltages of the plurality of rechargeable batteries 200 are detected one by one.

At S1043, the charging unit 20 is controlled to charge the rechargeable battery with the highest battery voltage to the first preset voltage.

At S1044, processes S1041-S1043 are repeated, to sequentially charge the remaining rechargeable batteries 200 to the first preset voltage in accordance with the order of the battery voltages from high to low.

At S105, the charging unit 20 is controlled to charge all of the rechargeable batteries 200 again to a second preset voltage.

In some embodiments, in the first charging mode, the charging unit 20 may sequentially charge the plurality of rechargeable batteries 200 to the first preset voltage by means of constant current charging, and then charge the plurality of rechargeable batteries 200 from the first preset voltage to the second preset voltage by means of constant voltage charging.

Figure 4:
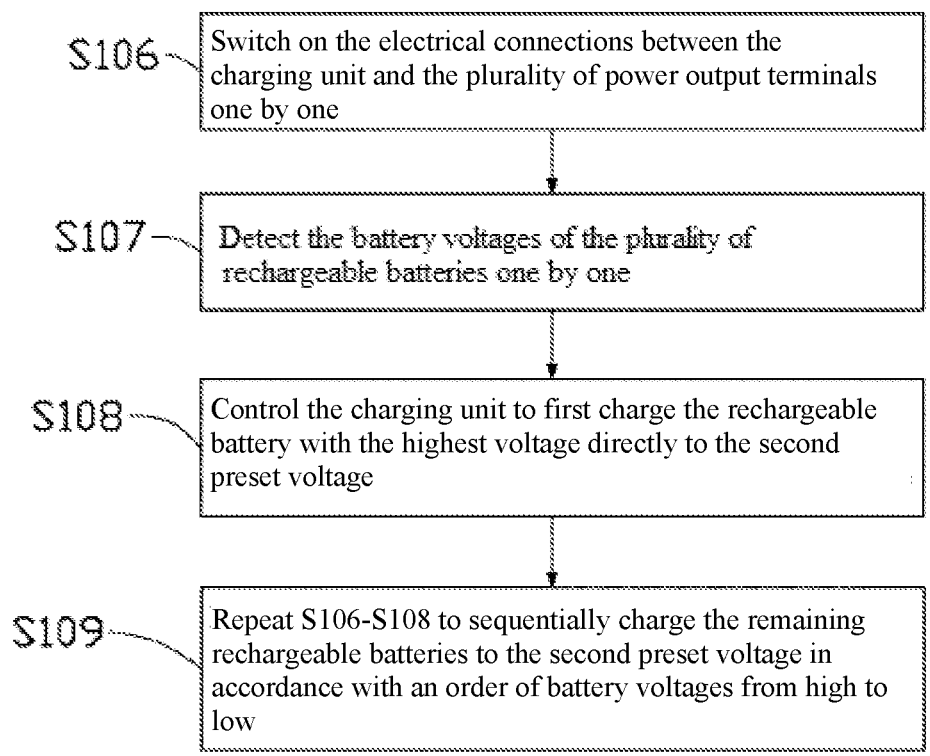
FIG. 4 is a schematic flow chart of a charging process in a second charging mode.

FIG. 4 shows an example charging process when the control unit 30 switches to the second charging mode in accordance with the switching signal. As shown in FIG. 4, at S106, the switch units 40 are controlled to switch on one by one, to switch on electrical connections between the charging unit 20 and the plurality of power output terminals 10 one by one.

At S107, battery voltages of the plurality of rechargeable batteries 200 are detected one by one.

At S108, the charging unit 20 is controlled to first charge the rechargeable battery 200 with the highest voltage value among the battery detected voltages directly to the second preset voltage.

At S109, S106-S108 are repeated to sequentially charge the remaining rechargeable batteries 200 to the second preset voltage in accordance with an order of the battery voltages from high to low.

In some embodiments, the first preset voltage is lower than the second preset voltage, and the second preset voltage may be a rated output voltage of the rechargeable battery 200 or a voltage slightly higher than the rated output voltage of the rechargeable battery 200, such as 1.2 times of the rated output voltage of the rechargeable battery 200.

Figure 5:
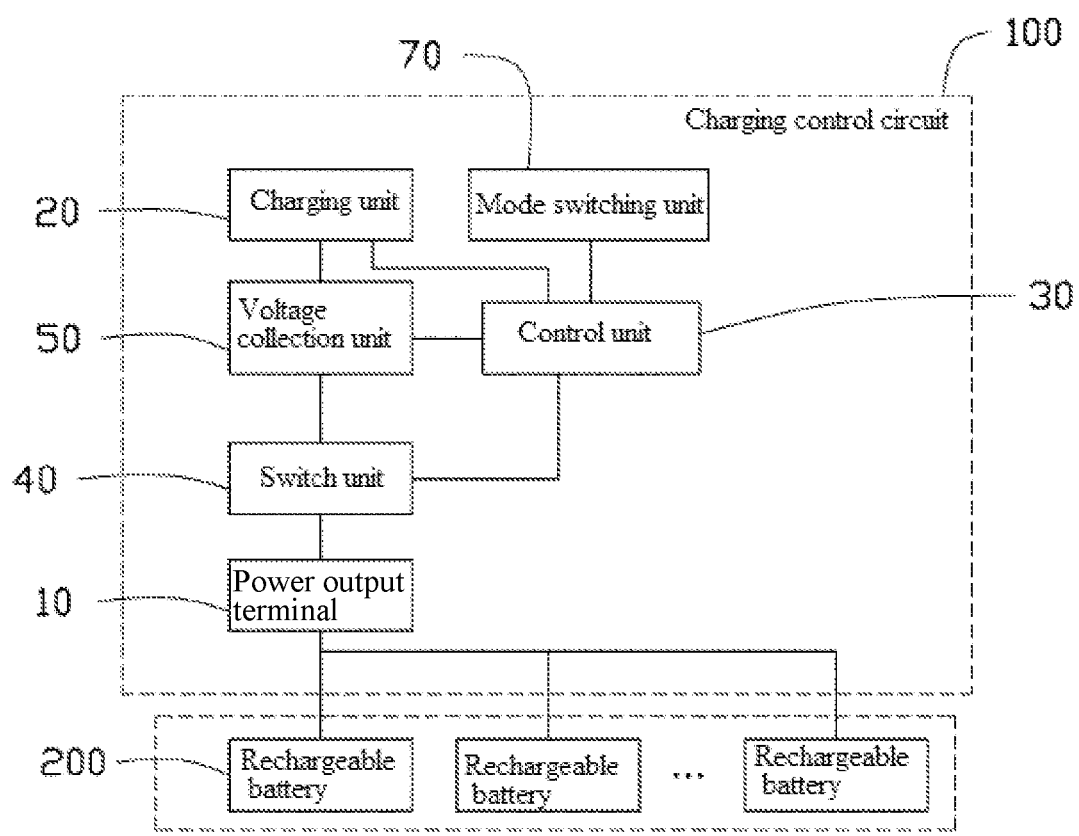
FIG. 5 is block diagram of a charging control circuit according to another embodiment of the present disclosure.

FIG. 5 shows a block diagram of another example of the charging control circuit consistent with the disclosure. In the example shown in FIG. 5, the switch unit 40 may include a switch chip integrated with multiple switches, and the power output terminal 10 may include a parallel port. Therefore, the number of the switch units 40 and the number of the power output terminals 10 both can be reduced to one. In this embodiment, respective ports of the power output terminal 10 can be connected to respective switches of the switch unit 40.

In some embodiments, the charging control circuit 100 may be mounted in a housing (not shown), and form a charging device together with the housing. In some embodiments, the charging device may form a charging system together with the plurality of rechargeable batteries 200.

Figure 6:
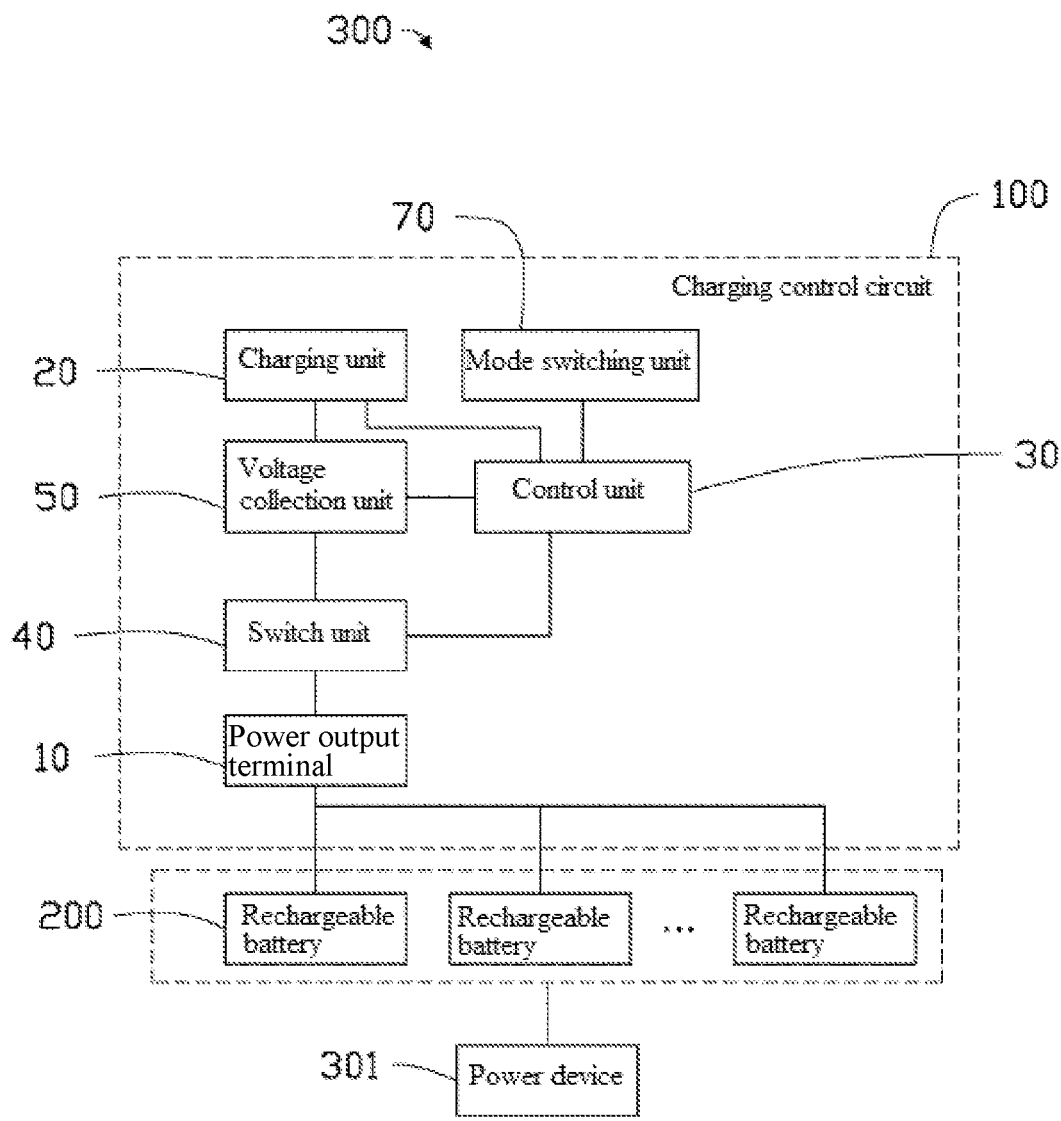
FIG. 6 is block diagram of a movable device according to an embodiment of the present disclosure.

FIG. 6 shows a block diagram of an example of a movable device 300 including the charging system consistent with the disclosure. The movable device 300 may be a vehicle, a ship, or the like. As shown in FIG. 6, the movable device 300 further includes a power device 301. The charging system may be electrically connected with the power device 301, and configured to provide electric energy to the power device 301.

Figure 7:
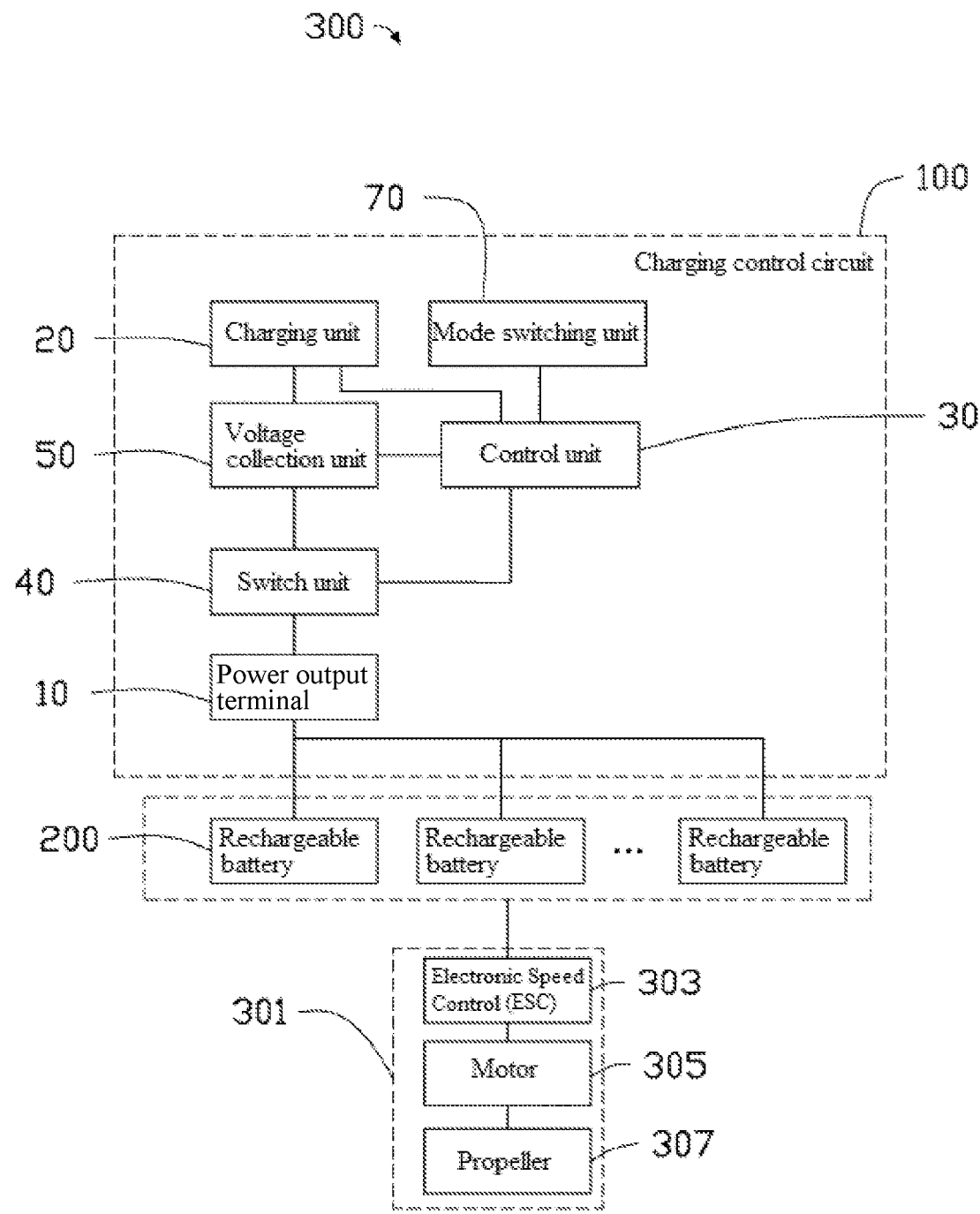
FIG. 7 is block diagram of a movable device according to another embodiment of the present disclosure.

FIG. 7 shows a block diagram of another example of the movable device 300. In the example shown in FIG. 7, the movable device 300 is an unmanned aerial vehicle. The power device 301 includes an Electronic Speed Control (ESC) 303, a motor 305, and a propeller 307. The ESC 303 is electrically connected to the motor 305, and configured to control a rotational speed of the motor 305. The propeller 307 is mounted on the motor 305, and configured to, under the driving of the motor 305, drive the unmanned aerial vehicle 300 to fly. The charging system is electrically connected to the ESC 303, and configured to provide electric energy to the power device 301.

According to the present disclosure, a plurality of rechargeable batteries can be charged by using two charging modes, and the two charging modes can be switched in accordance with user demands. That is, when there is a need to prevent high voltage batteries from discharging current to low voltage batteries during charging so as to effectively protect the rechargeable batteries, the charging control circuit can switch to the first charging mode. On the other hand, when there is a need to fully charge one rechargeable battery within the shortest time so as to meet user's need, the charging control circuit can switch to the second charging mode. As such, the charging control circuit is more practical.

The above descriptions are merely of some embodiments of the present disclosure, and are not intended to limit the scope of the present disclosure. Any equivalent structure or equivalent process flow modification made by using contents of the specification and the drawings of the present disclosure, or directly or indirectly applied to other related technical fields, should be likewise included in the scope of the present disclosure.

What is claimed is:

1. A charging control circuit comprising:
    a charging unit;
    a plurality of power output terminals configured to connect with a plurality of rechargeable batteries, respectively;
    a plurality of switch units each connected between the charging unit and one of the plurality of power output terminals; and
    a control unit electrically connected with the switch units and configured to:
        switch to a first charging mode or a second charging mode, and
        output, to the switch units, a switch signal corresponding to the first charging mode or the second charging mode, to cause the switch units to switch on or off electrical connections between the charging unit and the plurality of power output terminals,
    wherein the control unit is further configured to, when in the first charging mode:
        control the switch units to sequentially connect the plurality of power output terminals to the charging unit in accordance with battery voltages of the rechargeable batteries from high to low, to sequentially charge the plurality of rechargeable batteries to a first preset voltage, and
        control the switch units to connect all of the plurality of power output terminals to the charging unit, to charge all of the rechargeable batteries simultaneously from the first preset voltage to a second preset voltage.

2. The charging control circuit of claim 1, wherein the switch unit includes at least one of:
    a relay switch,
    a metal-oxide-semiconductor (MOS) transistor, a source of the MOS transistor being electrically connected with the charging unit, a drain of the MOS transistor being electrically connected with a corresponding one of the power output terminals, and a gate of the MOS transistor being electrically connected with the control unit, or
    a bipolar junction transistor (BJT), a collector of the BJT being electrically connected with the charging unit, an emitter of the BJT being electrically connected with a corresponding one of the power output terminals, and a base of the BJT being electrically connected with the control unit.

3. The charging control circuit of claim 1, wherein the control unit includes at least one of a Field-Programmable Gate Array (FPGA), a Micro-Controller Unit (MCU) with an embedded control program embedded, or a single chip computer.

4. The charging control circuit of claim 1, wherein the second preset voltage equals a rated output voltage of one of the rechargeable batteries or is slightly higher than the rated output voltage.

5. The charging control circuit of claim 1, wherein the control unit is further configured to:
    control the plurality of power output terminals to be connected with a voltage collection unit one by one through the switch units, to allow the voltage collection unit to detect the battery voltages of the plurality of rechargeable batteries one by one, and
    control one of the power output terminals that corresponds to the rechargeable battery with a highest battery voltage among the battery voltages that are detected to connect to the charging unit and other ones of the power output terminals to disconnect from the charging unit, to allow the charging unit to charge the rechargeable battery with the highest battery voltage to the first preset voltage.

6. The charging control circuit of claim 1, wherein the control unit is further configured to, when in the second charging mode, control the switch units to sequentially connect the power output terminals to the charging unit in accordance with an order of battery voltages of the rechargeable batteries from high to low, to sequentially charge the rechargeable batteries to a preset voltage, the preset voltage equaling a rated output voltage of one of the rechargeable batteries or being slightly higher than the rated output voltage.

7. The charging control circuit of claim 1, further comprising:
    a voltage collection unit connected between the charging unit and the switch units and connected to the control unit, the voltage collection unit being configured to collect battery voltages of the rechargeable batteries,
    wherein the control unit is further configured to, in accordance with the battery voltages collected by the voltage collection unit, control on or off of the electrical connections between the plurality of power output terminals and the charging unit through the switch units.

8. The charging control circuit of claim 7, wherein the control unit is further configured to control the plurality of power output terminals to be connected with the charging unit one by one through the switch units, to control the voltage collection unit to collect the battery voltages of the rechargeable batteries one by one.

9. The charging control circuit of claim 1, further comprising:
    a mode switching unit electrically connected with the control unit and configured to send a mode switching signal to the control unit to cause the control unit to switch to the first charging mode or the second charging mode.

10. The charging control circuit of claim 9, wherein output of the mode switching signal by the mode switching unit is implemented by means of hardware or software.

11. The charging control circuit of claim 9, wherein the mode switching unit comprises at least one of:
    a button configured to be operated to trigger output of the mode switching signal, or
    an automatic switching circuit configured to automatically output the mode switching signal when detecting a preset trigger condition.

12. A charging system comprising:
    a plurality of rechargeable batteries; and a charging control circuit configured to charge the plurality of rechargeable batteries, the charging control circuit comprising:
  a charging unit;
  a plurality of power output terminals connected with the plurality of rechargeable batteries, respectively;
  a plurality of switch units each connected between the charging unit and one of the plurality of power output terminals; and
  a control unit electrically connected with the switch units and configured to:
    switch to a first charging mode or a second charging mode, and
    output, to the switch units, a switch signal corresponding to the first charging mode or the second charging mode, to cause the switch units to switch on or off electrical connections between the charging unit and the plurality of power output terminals,
  wherein the control unit is further configured to, when in the first charging mode:
    control the switch units to sequentially connect the plurality of power output terminals to the charging unit in accordance with battery voltages of the rechargeable batteries from high to low, to sequentially charge the plurality of rechargeable batteries to a first preset voltage, and
    control the switch units to connect all of the plurality of power output terminals to the charging unit, to charge all of the rechargeable batteries simultaneously from the first preset voltage to a second preset voltage.

13. The charging system of claim 12, wherein the charging control circuit further comprises:
  a mode switching unit electrically connected with the control unit and configured to send a mode switching signal to the control unit to cause the control unit to switch to the first charging mode or the second charging mode.

14. A charging control method comprising:
  switching to a first charging mode or a second charging mode;
  outputting a switch signal corresponding to the first charging mode or the second charging mode; and
  switching on or off electrical connections between a charging unit and a plurality of power output terminals in accordance with the switch signal,
  wherein:
    the plurality of power output terminals are configured to connect with a plurality of rechargeable batteries, respectively,
    the charging unit is configured to charge the plurality of rechargeable batteries through the plurality of power output terminals, and
    the first charging mode comprises:
      sequentially charging the plurality of rechargeable batteries to a first preset voltage in accordance with an order of battery voltages of the rechargeable batteries from high to low; and
      controlling the charging unit to charge all of the rechargeable batteries simultaneously from the first preset voltage to a second preset voltage.

15. The charging control method of claim 14, further comprising:
  acquiring a mode switching signal,
  wherein switching to the first charging mode or the second charging mode includes switching to the first charging mode or the second charging mode in accordance with the mode switching signal.

16. The charging control method of claim 14, wherein sequentially charging the plurality of rechargeable batteries to the first preset voltage comprises:
  (a) switching on the electrical connections between the charging unit and the plurality of power out ends one by one;
  (b) detecting the battery voltages of the plurality of rechargeable batteries one by one;
  (c) controlling the charging unit to charge one of the rechargeable batteries with a highest battery voltage to the first preset voltage; and
  repeating (a)-(c) to sequentially charge remaining ones of the rechargeable batteries to the first preset voltage in accordance with the order of battery voltages from high to low.

17. The charging control circuit of claim 14, wherein the second preset voltage equals a rated output voltage of one of the rechargeable batteries or is slightly higher than the rated output voltage.

18. The charging control method of claim 14, wherein the second charging mode comprises:
  (d) switching on the electrical connections between the charging unit and the plurality of power out ends one by one;
  (e) detecting the battery voltages of the plurality of rechargeable batteries one by one;
  (f) controlling the charging unit to charge one of the rechargeable batteries with a highest battery voltage to a preset voltage, the preset voltage equaling a rated output voltage of one of the rechargeable batteries or being slightly higher than the rated output voltage; and
  repeating (d)-(f) to sequentially charge remaining ones of the rechargeable batteries to the preset voltage in accordance with an order of the battery voltages from high to low.

\* \* \* \* \*